No. 616,764. Patented Dec. 27, 1898.
H. W. L. McW. BOURKE.
APPARATUS FOR MANUFACTURING CYCLE HUBS.
(Application filed Oct. 26, 1897.)
(No Model.) 2 Sheets—Sheet 1.
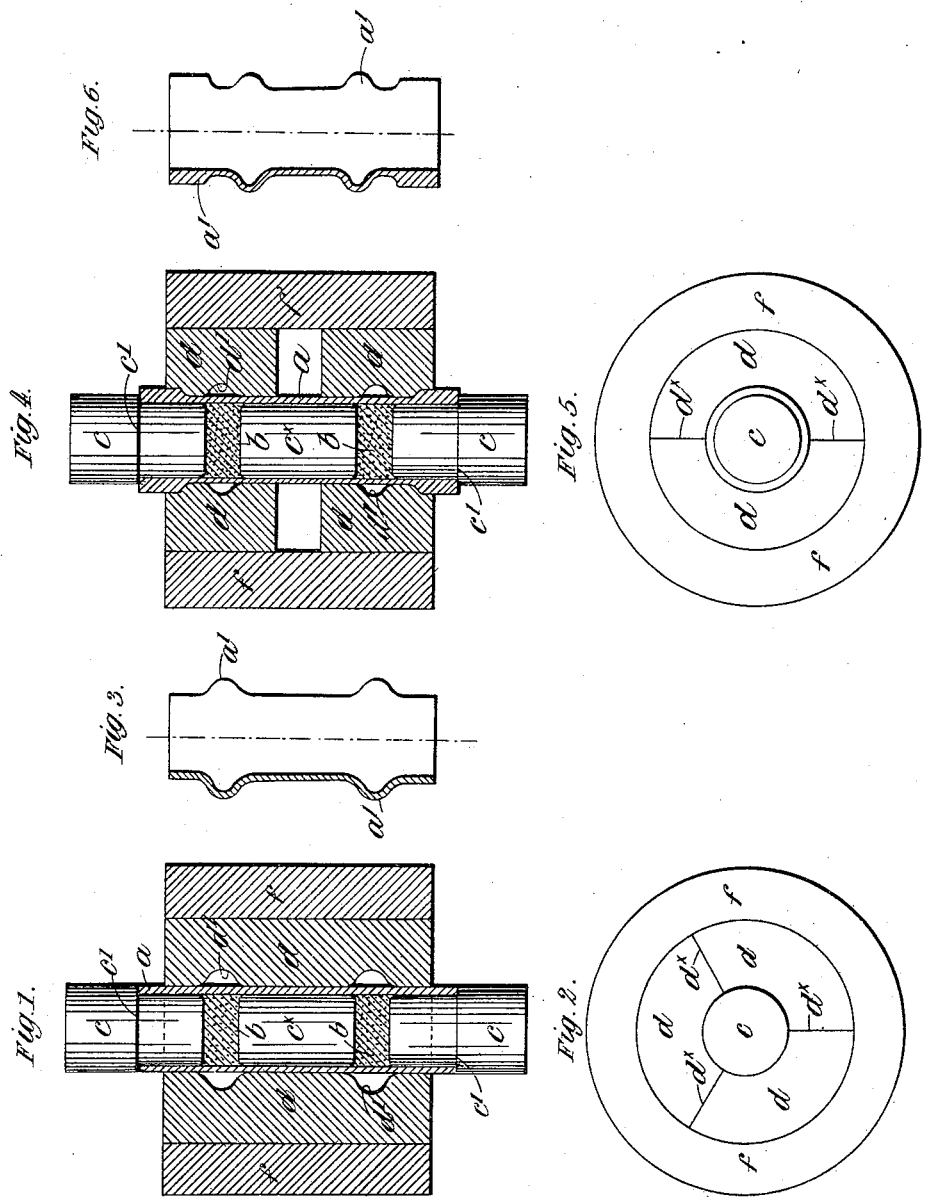
Witnesses.
Geo. W. Rea.
Robert Everett
Inventor.
Henry W. L. McW. Bourke,
By James L. Norris
Att'y.

No. 616,764. Patented Dec. 27, 1898.
H. W. L. McW. BOURKE.
APPARATUS FOR MANUFACTURING CYCLE HUBS.
(Application filed Oct. 26, 1897.)
(No Model.) 2 Sheets—Sheet 2.
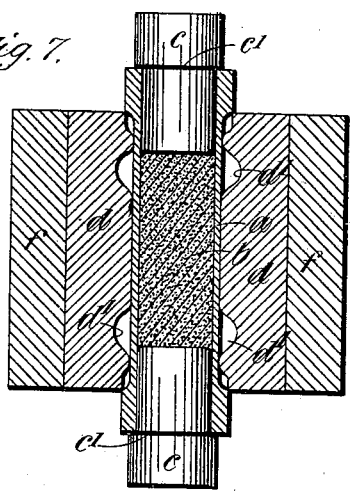
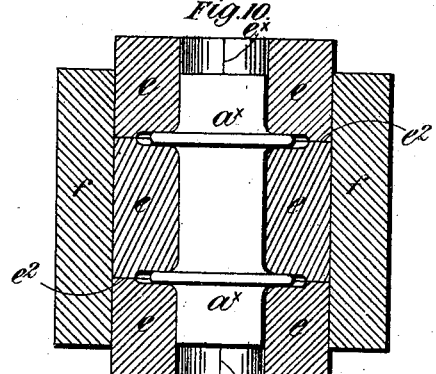
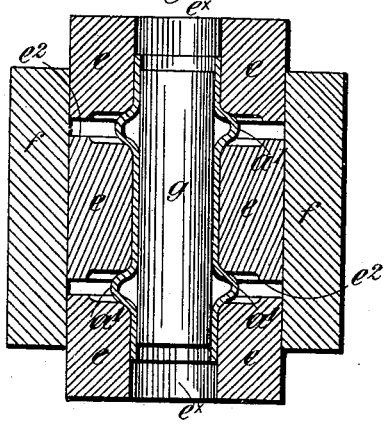
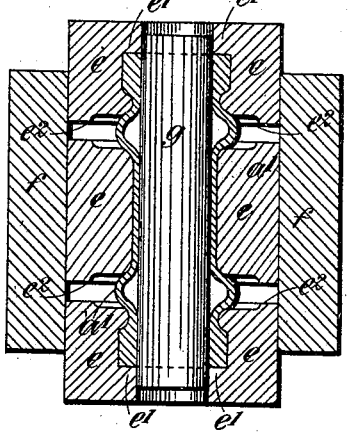
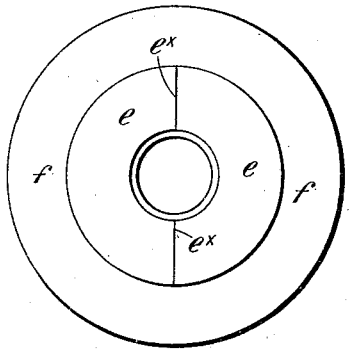
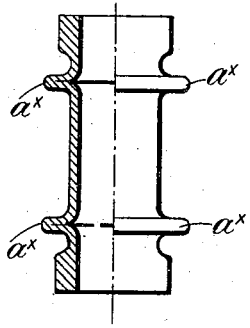
Witnesses.
Gro. W. Rea,
Robert Everett.
Inventor.
Henry W. L. McW. Bourke.
By James L. Norris.
Atty.
THE NORRIS PETERS CO., PHOTO-LITHO., WASHINGTON, D. C.

UNITED STATES PATENT OFFICE.

HENRY WALTER LAURIE McWM. BOURKE, OF LONDON, ENGLAND.

APPARATUS FOR MANUFACTURING CYCLE-HUBS.

SPECIFICATION forming part of Letters Patent No. 616,764, dated December 27, 1898.

Application filed October 26, 1897. Serial No. 656,425. (No model.)

*To all whom it may concern:*

Be it known that I, HENRY WALTER LAURIE McWM. BOURKE, mining-engineer, a subject of the Queen of Great Britain, residing at 42$^A$ Bravington road, London, England, have invented certain new and useful Improvements in Apparatus for the Manufacture of Cycle-Hubs, of which the following is a specification, reference being had to the accompanying drawings.

My invention relates to the manufacture of tubular hubs for cycles and for other purposes from tubes or tubular blanks, the spoke-flanges being formed integrally with such tubes or tubular blanks in the manner hereinafter described.

The formation of the spoke-flanges on the tube or tubular blank is effected in two stages or operations, in the first of which the tube or blank is bulged or beaded to form annular swellings or protuberances at the places where the flanges are required, while in the second the swellings or protuberances are flattened to form the spoke-flanges. According to the said invention the blanks are placed in suitable dies provided with external grooves where the swellings or protuberances are to be formed in the blanks. Suitable expansible material of a plastic nature—that is to say, of a nature capable of flowing or spreading under pressure—is placed in the blank and is compressed between dies or mandrels, so as to force the blank into the grooves of the dies, the ends of the blank being also forced inward to facilitate the expansion. After the swellings or protuberances are thus formed the blanks are transferred to other dies, in which the said swellings or protuberances are flattened by endwise pressure, so as to serve as spoke-flanges.

Figure 1 is a longitudinal section showing an arrangement for producing annular swellings or protuberances in a plain blank. Fig. 2 is a plan of the said arrangement. Fig. 3 shows, partly in elevation and partly in section, the blank with the swellings or protuberances. Figs. 4, 5, and 6 are corresponding views to the foregoing, the blank in this case having thickened ends. Fig. 7 is a modification of the arrangement shown in Fig. 4. Fig. 8 shows in longitudinal section an arrangement for flattening the protuberances on the blank when the latter is plain. Fig. 9 is a plan of the same. Fig. 10 is also a longitudinal section showing the parts after the flattening operation. Fig. 11 is a modification for use when the blank has thickened ends. Fig. 12 shows, partly in section and partly in elevation, a hub finished by the arrangement shown in Fig. 11.

$a$ is the blank; $b$, the expansible material, preferably in the form of disks or blocks; $c$ $c^\times$, the mandrels; $d$, the die or dies in which the blank is placed to form the swellings or protuberances $a'$, $d'$ being the internal grooves in the dies.

$e$ are the dies by which the swellings or protuberances are flattened to form the spoke-flanges $a^\times$.

The dies $d$ and $e$ are split or divided longitudinally at $d^\times$ and $e^\times$ to facilitate the insertion and removal of the blank, while an outer ring $f$ or other suitable device is placed around the dies to keep the parts of the same together.

The tube or tubular blank $a$ may be plain or of equal thickness and diameter throughout its length, as in Fig. 1, or it may be thickened at the ends, as in Fig. 4.

To bulge or bead the tubular blank, so as to form the swellings or protuberances $a'$, the mandrels $c$ and expansible disks or blocks $b$ are placed in its interior, as in Figs. 1 and 4. The mandrels $c$ serve to close each end of the blank and have shoulders $c'$, which bear on the ends of the tubular blank and serve to force the ends of the bank inward or into the die, which action assists that of the lateral expansion of the disks or blocks $b$ in dilating the blank in the required parts. The bulging or beading die $d$ may be simply split or divided longitudinally, as in Figs. 1, 2, and 7, or it may be divided transversely into two or more separate portions or sections in addition to being split or divided longitudinally. (See Figs. 4 and 5.) The central mandrel $c^\times$ is intended to be inserted between the disks or blocks of expansible material when two or more of them are employed, as in Figs. 1 and 4, and in the latter case prevents any bulging of the blank into the space between the upper and lower sections of the die.

The expansible disks or blocks $b$ may be composed of india-rubber or the like, lead, or other suitable plastic material of the kind hereinbefore referred to. I prefer, however, to employ india-rubber, as it so easily resumes its normal condition when the pressure is removed.

In some cases a single plug or cylinder of expansible material $b$ is used between the end mandrels $c$, as in Fig. 7, instead of the disks above referred to.

The tubular blank $a$, with the expansible material therein, is placed in the bulging or beading die $d$, which, as stated, has suitably-shaped grooves $d'$ for the tube to bulge into, and itself fits into the ring or other device $f$, which holds the die together while the tubular blank is being bulged. Pressure is applied on the end mandrels $c$ $c$, and the disks $b$, expanding laterally, commence to bulge the tubular blank, which at the same time is forced into the die by the shoulders $c'$ on the end mandrels $c$ until finally the tube or blank conforms to the shape of the die, Figs. 3 and 6.

The second operation—that is to say, the flattening of the swellings or projections $a'$, so as to form the spoke-flanges $a^\times$—is performed by placing the blank inside the closing-in or flattening dies $e$, Figs. 8 to 12, these being in two or more sections, as may be suitable, the said sections embracing the blank immediately above and below each protuberance. In the arrangement shown in Fig. 11 the outer dies have shoulders $e'$, which rest on the ends of the tubular blank $a$ and serve to push them inward while the protuberances $a'$ are being flattened. The ring or collar or other suitable contrivance into which the dies are fitted to keep the parts of the same together must of course be so shaped that it will permit the dies to move therein when being forced together. To prevent undue compression of the flanges, the sections of the die may be provided with shoulders $e^2$ or other suitable stops which serve to limit the extent to which the said sections can be brought together. A mandrel $g$, Figs. 8 and 11, is placed inside the blank $a$ to prevent distortion of the blank while the protuberances $a'$ are being flattened. Pressure being applied to the outer dies by any suitable means, the said dies are forced toward each other, (see Fig. 10,) the protuberances $a'$ being flattened out between them and the inner die, as in Figs. 10 and 12, to form the spoke-flanges $a^\times$.

What I claim is—

1. In the manufacture of a wheel-hub from a tubular blank, apparatus for producing swellings for forming the spoke-flanges, such apparatus comprising a multiple-part die in which the blank is inserted and having peripheral grooves into which the walls of said blank are adapted to be forced, a muff surrounding said die for holding the parts thereof in position, a block of india-rubber arranged to be placed within said blank and extending beyond the grooves, a multiple-part mandrel one part of which is adapted to be inserted in each end of the blank, and means for forcing said mandrel inwardly, thereby expanding said rubber block and blank outwardly, substantially as and for the purposes specified.

2. An apparatus for making a hub with spoke-flanges comprising a die formed in two or more parts, in which the blank is inserted, means for retaining said parts in their assembled position, internal grooves in said die, a multiple-part mandrel, one part of which is placed within the blank between blocks of plastic material which are opposite the grooves, the other parts entering opposite ends of the blank and adapted to be forced inwardly and spread the blank into the grooves, substantially as described.

3. In the manufacture of a wheel-hub from a tubular blank, apparatus for producing annular swellings for forming the spoke-flanges, such apparatus comprising a multiple-part die in which the blank is inserted and having grooves into which the walls of said blank are adapted to be forced, said die being divided transversely into two members or portions, a muff surrounding said die for holding the parts thereof in position, a multiple-part mandrel one part of which is adapted to be placed within the blank between the positions of the annular swellings and two other parts, one in each end of said blank, a block of india-rubber adapted to be placed within said blank adjacent to each of the desired annular swellings and between the parts of the said mandrel, and means for forcing inwardly said mandrel, substantially as and for the purposes specified.

In testimony whereof I have hereunto set my hand this 14th day of October, 1897.

HENRY WALTER LAURIE McWM. BOURKE.

Witnesses:
CHAS. B. BURDON,
A. B. CROFTS.